United States Patent
Ju et al.

(10) Patent No.: US 6,759,084 B1
(45) Date of Patent: Jul. 6, 2004

(54) PROCESS TO FORM NOL STRUCTURE FOR CPP GMR

(75) Inventors: Kochan Ju, Monte Sereno, CA (US); Min Li, Fremont, CA (US); Simon Liao, Fremont, CA (US); Jeiwei Chang, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 128 days.

(21) Appl. No.: 10/455,036

(22) Filed: Jun. 5, 2003

(51) Int. Cl.$^7$ ............................................. B05D 5/12
(52) U.S. Cl. ............................. 427/126.4; 204/192.1; 427/123; 427/126.3; 427/130; 427/131; 427/132; 427/250; 427/258; 427/331; 427/404; 427/419.2
(58) Field of Search ............... 204/192.1; 427/126.4, 427/123, 126.3, 130, 131, 132, 250, 258, 331, 404, 419.2

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 5,715,121 A | 2/1998 | Sakakima et al. | 360/113 |
| 6,452,763 B1 | 9/2002 | Gill | 360/324.11 |

OTHER PUBLICATIONS

Toshiba Abstract Intermag Europe 2002 Amsterdam, M. Takegishi et al., "The Applicability of CPP–GMR for Over 100 Gbpsi."
Fujitsu Laboratories Ltd., Abstract Intermag Europe 2002 Amsterdam, K. Nagasaka et al., "Highly Sensitive CPP Elements Using Spin–Value Film with Nano–Oxide Layers for Over 100 Gbit/Inch$^2$ Read Heads".

*Primary Examiner*—Bernard Pianalto
(74) *Attorney, Agent, or Firm*—George O. Saile; Stephen B. Ackerman

(57) ABSTRACT

It is important for a CPP GMR read head that it have both high resistance as well as high cross-sectional area. This has been achieved by inserting a NOL (nano-oxide layer) though the middle of one or both of the two non-magnetic conductive layers. A key feature is that the NOL is formed by first depositing the conductive layer to about half its normal thickness. Then a metallic film is deposited thereon to a thickness that is low enough for it to still consist of individual islands. The latter are then fully oxidized without significantly oxidizing the conductive layer on which they lie. The remainder of the conductive layer is then deposited to a thickness sufficient to fully enclose the islands of oxide.

34 Claims, 2 Drawing Sheets

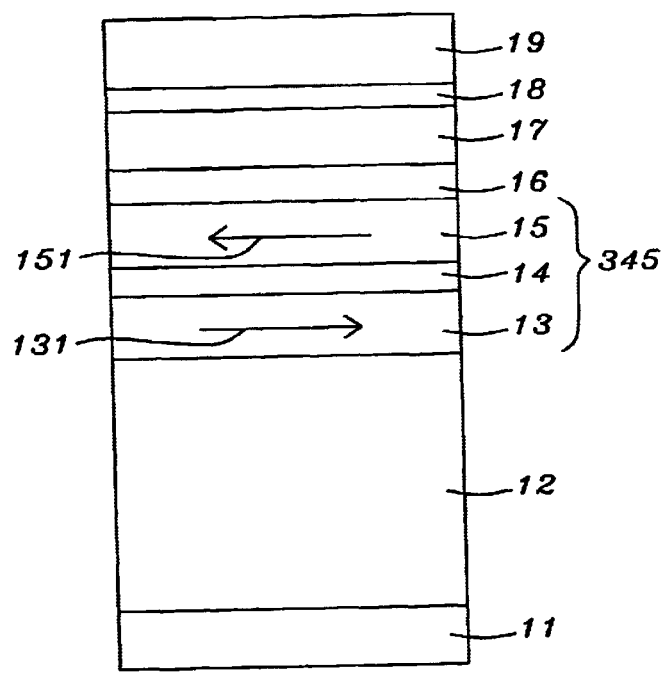
FIG. 1 – Prior Art
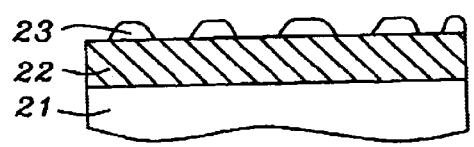
FIG. 2a
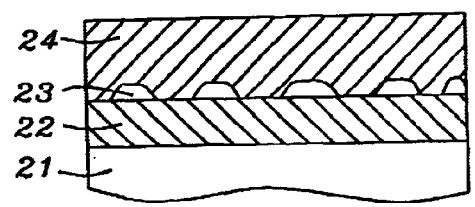
FIG. 2b

PROCESS TO FORM NOL STRUCTURE FOR CPP GMR

FIELD OF THE INVENTION

The invention relates to the general field of CPP GMR read heads with particular reference to increasing transverse resistance without sacrificing dimensional control.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are seed layer 11 on which is antiferromagnetic layer 12 whose purpose is to act as a pinning layer for magnetically pinned layer 345. The later may be a single ferromagnetic layer or, preferably, a synthetic antiferromagnetic (formed by sandwiching antiferromagnetic coupling layer 14 between two antiparallel ferromagnetic layers 13 and 15). This results in an increase in the size of the pinning field so that a more so pined layer is obtained. Next is non-magnetic spacer layer 16 on which is low coercivity (free) ferromagnetic layer 17. A contacting layer 18 lies atop free layer 17 and cap layer 19 is present over layer 18 to protect the structure during processing.

When free layer 17 is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field. If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8–20%.

Most GMR devices have been designed so as to measure the resistance of the free layer for current flowing parallel to the film's plane. However, as the quest for ever greater densities continues, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible while the resistance of the leads into and out of the device need not be particularly low. By contrast, in a CPP device, the resistivity of the leads tend to dominate and should be as low as possible.

It can be shown that the greater the Resistance×Area (RA) the greater the sensitivity of the device, i.e. a device having both high resistance as well as high cross-sectional area is to be desired. At first glance these appear to be conflicting requirements since increasing the area decreases the resistance. To overcome this problem, several groups have proposed to increase RA by inserting a NOL (nano-oxide layer) within a CPP GMR structure [1]. The idea is to reduce the available area through which current can flow while continuing to maintain the physical dimension of the reader head relatively large. Fujitsu [1] used a layer of CoFeB oxide at the outer interface of the free layer to increase RA by forcing current to flow through pinholes in the CoFeB oxide layer. This increased the RA to between about 0.25 and 1 ohm.$\mu m^2$. Toshiba [2] used a NOL of aluminum oxide over copper in the spacer layer to confine current to passing through unoxidized Cu. This increased RA to between about 0.25 and 0.7 ohm.$\mu m^2$.

The main problem with the NOL process described above is that it relies on the appearance of pin holes within a film that, under ideal conditions, should have none. This makes for a non-reproducible process giving unpredictable results. In this disclosure, a different concept and method of making the NOL layer in a CPP GMR are disclosed.

A routine search of the prior art was performed with the following references of interest being found:

In U.S. Pat. No. 6,452,763, Gill discloses a GMR design with a nano-oxide layer in the second anti-parallel pinned layer. U.S. Pat. No. 5,715,121 (Sakakima et al.) shows a related process for a MR element. In U.S. Pat. No. 5,627,704, Lederman et al. show a GMR CPP transducer with a flux guide yoke structure while in U.S. Pat. No. 5,668,688, Dyker et al. show a CPP GMR structure.

The two references numbered in the preceding text are.

[1] Fujitsu abstract Intermag Europe 2002 Amsterdam.

[2] Toshiba abstract Intermag Europe 2002 Amsterdam.

SUMMARY OF THE INVENTION

It has been an object of at least one embodiment of the present invention to provide a process to manufacture a CPP GMR magnetic read head.

Another object of at least one embodiment of the present invention has been that devices resulting from application of said process have a high resistance×area product.

Still another object of at least one embodiment of the present invention has been that said process be compatible with existing processes for the manufacture of CPP GMR devices.

These objects have been achieved by increasing the transverse resistance of one or both of the non-magnetic conductive layers (i.e, the spacer and the contacting layers) without reducing their overall area. To accomplish this, a NOL (nano-oxide layer) is inserted through the middle of the conductive layer in question. A key feature of the invention is that the NOL is formed by first depositing the conductive layer to about half its normal thickness. Then a metallic film is deposited thereon to a thickness that is low enough for it to still be discontinuous i.e. to consist of individual islands. These islands are of a material that can be fully oxidized without significantly oxidizing the conductive layer on which they lie. This substructure is competed by depositing the remainder of the conductive layer to a thickness sufficient to fully enclose the islands of oxide. The process can be applied to the spacer, the contacting layer, or both. In all cases a significant increase of the resistance-area product of the device is obtained.

BRIEF DESCRIPTION OF THE DRAWINGS

FIG. 1 shows a GMR stack of the prior art.

FIG. 2a shows a discontinuous film on a conducive substrate.

FIG. 2b shows the film of FIG. 2a after it has been oxidized and encapsulated.

DESCRIPTION OF THE PREFERRED EMBODIMENTS

It is known that Cu has law miscibility with some materials such as Ta, CoFe, Co, Fe, Al, Hf etc. In common with all materials deposited from the vapor phase, their initial growth is in the form of islands that nucleate separately, and then grow until they form a continuous film. Usually the latter stage is not reached until the mean deposited thickness. exceeds several Angstroms. Secondly, and most importantly, the listed materials are easier to oxidize than Cu (and several other materials that could be used to form the spacer layer in the GMR stack described earlier). The present invention exploits these properties by forming an NOL layer in a novel way—oxidizing islands of Ta, CoFe, etc on top of a copper surface.

$1^{st}$ Embodiment

Figure 3:
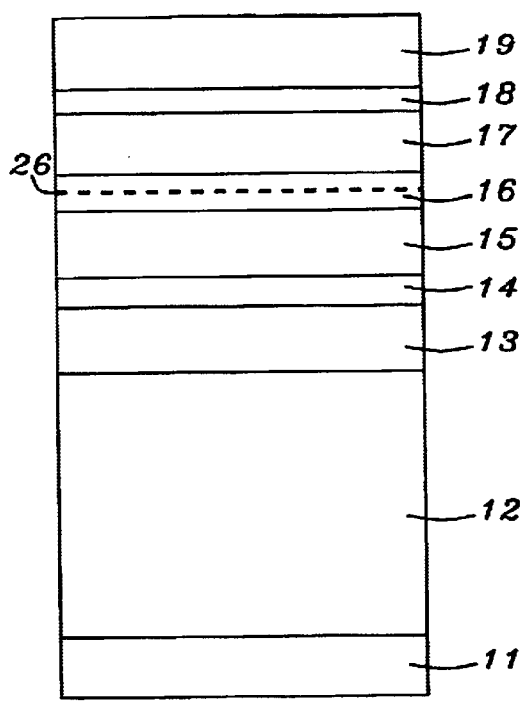
FIGS. 3–5 show the structures that result from exercising each of the three embodiments of the present invention.

Referring now to FIG. 3, the process of the present invention begins with the provision of a substrate (not shown) on which is deposited seed layer 11. Typical materials for the latter include Ta, NiCr, and NiFeCr. The purpose of the seed layer is to provide an improved nucleating surface for antiferromagnetic layer 12 which is deposited next and which will serve as a pinning layer. Layer 12 can be MnPt, IrMn, or NiMn. The synthetic antiferromagnetic, made up of layers 13, 14, end 15 (which was discussed earlier) is now deposited and becomes the pinned layer.

Now follows a key feature of the invention. Normally, as seen in FIG. 1, the next step would be the deposition of spacer layer 16 in the form of a single homogeneous layer. However, layer 16 is now formed in several stages, as illustrated in FIG. 2a. First, about half the normal thickness of the spacer layer is deposited as lower layer 22 (with layer 21 representing layers 11 through 15). Typically, the thickness of layer 22 would be between about 10 and 20 Angstroms.

Then, one of the easily oxidized metals enumerated earlier is deposited onto layer 22 in the form of islands 23. The effective thickness of 23 is between about 1 and 5 Angstroms. Our preferred deposition approach has been tantalum deposited through DC sputtering at a substrate temperature of about 30° C., but other deposition methods (such as evaporation or RF sputtering) could also have been used.

Once islands 23 are in place they are fully oxidized under conditions that cause virtually no oxidation of lower layer 22. Our preferred method for accomplishing this has been radical oxidation by means of a 0.8 SCCM oxygen flow rate for about 5 seconds, monitored through 0.15V photo detection. This does not mean that similar methods such as natural oxidation (10–30 mtorr of oxygen for about 60 seconds) or plasma oxidation (about 50W of 5 mtorr oxygen for about 3 seconds) could not be used instead.

Formation of the spacer layer is completed by depositing upper layer 24 (see FIG. 2b) of the same, or similar, material as layer 22, for a total spacer layer thickness of between about 4 and 30 Angstroms, care being taken to ensure that oxide islands 26 become fully enclosed. Thus, any current flowing transversely through the spacer layer is now constrained to flow through openings, such as 25, between the oxide islands, thereby ensuring that the spacer layer has a high transverse resistance.

Returning now to FIG. 3, formation of the GMR stack is completed by depositing free layer 17 on spacer layer 16, followed by contacting layer 18 and cap layer 19.

$2^{nd}$ Embodiment

Figure 4:
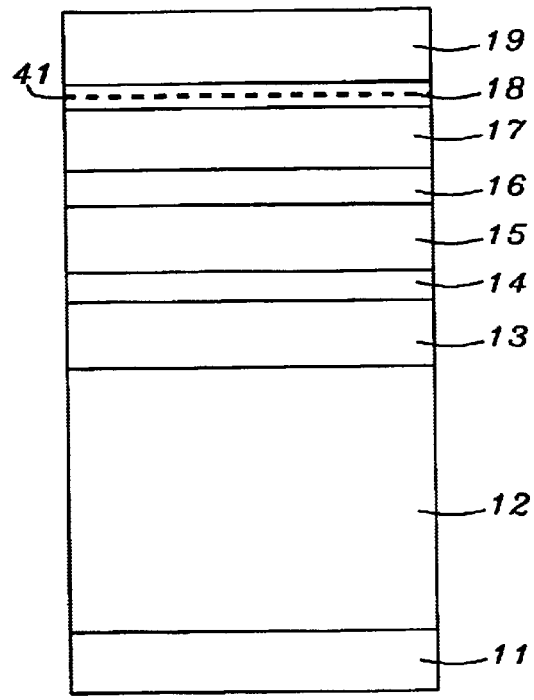

As seen in FIG. 4, this embodiment is similar to the first embodiment for all steps up to formation of the spacer layer but, in this case, it is a single homogeneous layer of conductive material, as taught by the prior art. Also conventional is free layer 17 which is a low coercivity ferromagnetic material.

The novel feature of the second embodiment lies in the sub-process for forming contacting layer 18. This is similar to the sub-process for forming the spacer layer in the first embodiment:

Referring once more to FIG. 2a, about half the normal thickness of the contacting layer is deposited as lower layer 22 (with layer 21 here representing layers 11 through 17). Typically, the thickness of layer 22 in this case would be between about 2 and 10 Angstroms. As noted earlier, any conductive non-magnetic material that is relatively difficult to oxidize could, in principle, be used here for layer 22 although copper is much to be preferred.

Then, one of the easily oxidized metals enumerated earlier is deposited onto layer 22 in the form of islands 23. The effective thickness of 23 is between about 1 and 5 Angstroms. Our preferred deposition method has been DC sputtering at a substrate temperature of about 30° C., other deposition methods (such as evaporation or RF sputtering) could also have been used.

Once islands 23 are in place they are fully oxidized under conditions that cause virtually no oxidation of lower layer 22. Details are the same as described above for the first embodiment.

Formation of the contacting layer is completed by depositing upper layer 24 (see FIG. 2b) of the same, or similar, material as layer 22, for a total contacting layer thickness of between about 2 and 20 Angstroms, care being taken to ensure that oxide islands 26 become fully enclosed. Thus, any current flowing transversely through the contacting layer is now constrained to flow through openings, such as 25, between the oxide islands, thereby ensuring that the contacting layer has a high transverse resistance.

Returning now to FIG. 4, formation of the GMR stack is completed by the deposition of cap layer 19.

$3^{rd}$ Embodiment

Figure 5:
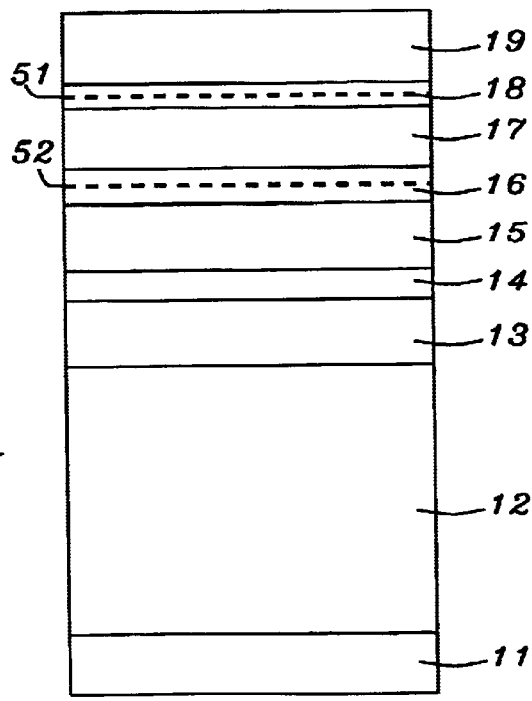

The structure that results from the process of the third embodiment is illustrated in FIG. 5. It is apparent that the third embodiment combines the first and second processes into a single process. Thus, spacer layer 16 of the third embodiment process is formed in several steps, as discussed above, which results in the encapsulation within it of NOL 52. Similarly, NOL 51 gets encapsulated within contacting layer 18.

RESULTS

The results of applying the process of the present invention are summarized in the data presented in TABLE I below:

TABLE I

| NOL included? | R ($\mu$ohm.m$^2$) | $\Delta$R ($\mu$ohm.m$^2$) | GMR (%) |
| --- | --- | --- | --- |
| YES | 0.194 | 3.96 | 2.05 |
| NO (prior art) | 0.134 | 2.41 | 1.82 |

The above data confirm the effectiveness of the present invention.

What is claimed is:

1. A process to manufacture a CPP GMR read head, comprising:

depositing, in succession, on a substrate, a seed layer, a pinning layer and a pinned layer;

on said pinned layer, depositing a lower layer of a non-magnetic conductive material;

on said lower layer, depositing, to a thickness, a layer of a non-magnetic material that is more easily oxidized than said non-magnetic conductive material, said thickness being such that said layer of a non-magnetic material has the form of islands that lie on said lower layer;

fully oxidizing said islands of non-magnetic material under conditions such that said lower layer is not oxidized;

then depositing an upper layer of said first non-magnetic conductive material, on said lower layer, to a thickness sufficient to fully enclose said fully oxidized islands, thereby forming a spacer layer having high transverse resistance;

on said spacer layer, depositing a free layer;

on said free layer, depositing a contacting layer; and depositing a cap layer on said contacting layer.

2. The process described in claim 1 wherein said non-magnetic conductive material is copper.

3. The process described in claim 1 wherein said non-magnetic material is Ta, Al, CoTe, Cd, or HF.

4. The process described in claim 1 wherein the thickness of said layer of non-magnetic material is between about 1 and 5 Angstroms.

5. The process described in claim 1 wherein said lower layer is deposited to a thickness between about 2 and 10 Angstroms.

6. The process described in claim 1 wherein said spacer layer has a total thickness of between about 4 and 30 Angstroms.

7. The process described in claim 1 wherein the step of deposited said layer of a non-magnetic material further comprises DC sputtering, evaporation, or RF sputtering.

8. The process described in claim 1 wherein the step of fully oxidizing said layer of a non-magnetic material further comprises radical oxidation by means of a 0.8 SCCM oxygen flow rate for about 5 seconds, monitored through 0.15V photo detection, natural oxidation at between 10 and 30 mtorr of oxygen for about 60 seconds, or plasma oxidation using about 50W of 5 mtorr oxygen for about 3 seconds.

9. The process described in claim 1 wherein said pinned layer comprises two magnetically anti-parallel ferromagnetic layers separated by an antiferromagnetic coupling layer.

10. A process to manufacture a CPP GMR read head, comprising:

depositing, in succession on a substrate, a seed layer, a pinning layer, a pinned layer, a spacer layer, and a free layer;

on said free layer, depositing a lower layer of a non-magnetic conductive material;

on said lower layer, depositing, to a first thickness, a layer of a non-magnetic material that is more easily oxidized than said non-magnetic conductive material, said first thickness being such that said layer of a non-magnetic material has the form of islands that lie on said lower layer;

fully oxidizing said island of non-magnetic material under conditions such that said lower layer is not oxidized;

then depositing an upper layer of said non-magnetic conductive material, on said lower layer, to a second thickness that is sufficient to fully enclose all fully oxidized islands, thereby forming a contacting layer; and depositing a cap layer on said contacting layer.

11. The process described in claim 10 wherein said non-magnetic conductive material is copper.

12. The process described in claim 10 wherein said non-magnetic material is Ta, Al, CoTe, Cd, or Hf.

13. The process described in claim 10 wherein the thickness of said layer of non-magnetic material is between about 1 and 5 Angstroms.

14. The process described in claim 10 wherein said lower layer is deposited to a thickness between about 2 and 10 Angstroms.

15. The process described in claim 10 wherein said contacting layer has a total thickness of between about 4 and 30 Angstroms.

16. The process described in claim 10 wherein the step of depositing said layer of a non-magnetic material further comprises DC sputtering, evaporation, or RF sputtering.

17. The process described in claim 10 wherein the step of fully oxidizing said layer of a non-magnetic material further comprises radical oxidation by means of a 0.8 SCCM oxygen flow rate for about 5 seconds, monitored through 0.15V photo detection, natural oxidation at between 10 and 30 mtorr of oxygen for about 60 seconds, or plasma oxidation using about 50W of 5 mtorr oxygen for about 3 seconds.

18. The process described in claim 10 wherein said pinned layer comprises two magnetically anti-parallel ferromagnetic layers separated by an antiferromagnetic coupling layer.

19. A process to manufacture a CPP GMR read head, comprising:

depositing, in succession on a substrate, a seed layer, a pinning layer and a pinned layer;

on said pinned layer, depositing a first lower layer of a first non-magnetic conductive material;

on said first lower layer, depositing, to a first thickness, a layer of a first non-magnetic material that is more easily oxidized than said first non-magnetic conductive material, said first thickness being such that said layer of a first non-magnetic material has the form of islands that lie on said first lower layer;

fully oxidizing said islands of first non-magnetic material under conditions such that said first lower layer is not oxidized;

then depositing a first upper layer of said first non-magnetic conductive material, on said first lower layer, to a second thickness sufficient to fully enclose said fully oxidized islands, thereby forming a spacer layer;

on said spacer layer, depositing a free layer;

on said free layer, depositing a second lower layer of a second non-magnetic conductive material;

on said second lower layer, depositing, to a second thickness, a layer of a second non-magnetic material that is more easily oxidized than said second non-magnetic conductive material, said second thickness being such that said layer of a second non-magnetic material has the form of islands that lie on said second lower layer;

fully oxidizing said islands of second non-magnetic material under conditions such that said second lower layer is root oxidized;

then depositing a second upper layer of said second non-magnetic conductive, on said second lower layer, to a third thickness sufficient to fully enclose all fully oxidized islands, thereby forming a contacting layer; and depositing a cap layer on said contacting layer.

20. The process described in claim 19 wherein said first non-magnetic conductive material is copper.

21. The process described in claim 19 wherein said first non-magnetic material is Ta, Al, CoTe, Cd, or Hf.

22. The process described in claim 19 wherein the thickness of said first layer of non-magnetic material is between about 1 and 5 Angstroms.

23. The process described in claim 19 wherein said first lower layer is deposited to a thickness between about 2 and 10 Angstroms.

24. The process described in claim 19 wherein said space layer has a total thickness of between about 4 and 30 Angstroms.

25. The process described in claim 19 wherein the step of depositing said layer of a non-magnetic material further comprises DC sputtering, evaporation, or RF sputtering.

26. The process described in claim 19 wherein the step of fully oxidizing said layer of a non-magnetic material further comprises radical oxidation by means of a 0.8 SCCM oxygen flow rate for about 5 seconds, monitored through 0.15V photo detection, natural oxidation at between 10 and 30 mtorr of oxygen for about 60 seconds, or plasma oxidation using about 50W of 5 mtorr oxygen for about 3 seconds.

27. The process described in claim 19 wherein said second non-magnetic conductive material is copper.

28. The process described in claim 19 wherein said second non-magnetic material is Ta, Al, CoTe, Cd, or Hf.

29. The process described in claim 19 wherein the thickness of said second layer of non-magnetic material is between about 1 and 5 Angstroms.

30. The process described in claim 19 wherein said second lower layer is deposited to a thickness between about 2 and 5 Angstroms.

31. The process described in claim 19 wherein said contacting layer has a total thickness of between about 4 and 20 Angstroms.

32. The process described in claim 19 wherein the step of depositing said layer of a non-magnetic material further comprises DC sputtering, evaporation, or RF sputtering.

33. The process described in claim 19 wherein the step of fully oxidizing said layer of a non-magnetic material further comprises radical oxidation by means of a 0.8 SCCM oxygen flow rate for about 5 seconds, monitored through 0.15V photo detection, natural oxidation at between 10 and 30 mtorr of oxygen for about 60 seconds, or plasma oxidation using about 50W of 5 mtorr oxygen for about 3 seconds.

34. The process described in claim 19 wherein said pinned layer comprises two magnetically anti-parallel ferromagnetic layers separated by an antiferromagnetic coupling layer.

* * * * *